United States Patent [19]

Yada et al.

[11] 4,147,682

[45] Apr. 3, 1979

[54] ADDITIVE COMPOSITION FOR USE IN PAPERMAKING

[75] Inventors: Akira Yada, Nagoya; Isamu Iijima, Mishima; Jo Itakura; Saburo Fujikura, both of Nagoya, all of Japan

[73] Assignees: Toagosei Chemical Industry Co., Ltd., Tokyo; Osakagodo Company Ltd., Osaka, both of Japan

[21] Appl. No.: 858,500

[22] Filed: Dec. 7, 1977

[30] Foreign Application Priority Data

Dec. 9, 1976 [JP] Japan ................................. 51-147175

[51] Int. Cl.$^2$ ............................................. C08L 33/04
[52] U.S. Cl. ......................... 260/29.6 SQ; 162/181 A; 260/29.6 M; 260/29.6 MM
[58] Field of Search ................. 260/29.6 M, 29.6 MM, 260/29.6 SQ; 162/181 A

[56] References Cited

U.S. PATENT DOCUMENTS

| 3,128,223 | 4/1964 | von Rosenberg et al. ...... 162/181 A |
| 3,755,236 | 8/1973 | Puskas .......................... 260/29.6 SQ |
| 3,890,180 | 6/1975 | Grosse et al. ................. 260/29.6 SQ |
| 3,993,830 | 11/1976 | Dickson et al. ................ 260/29.6 M |
| 4,021,398 | 5/1977 | Gilman et al. ............. 260/29.6 MM |

*Primary Examiner*—Melvyn I. Marquis
*Attorney, Agent, or Firm*—Karl W. Flocks

[57] ABSTRACT

An additive composition for use in papermaking comprises a water-soluble polymer having in its molecule —COOH groups and/or —SO$_3$H groups, polyaluminum chloride and an aqueous solvent. Because of formation of a kind of crosslinking structure between the water-soluble polymer molecules through the polyaluminum chloride, the above composition exerts an effect effect of enhancing the paper strength when used alone and an effect of enhancing both the sizing effect and the paper strength when used together with a sizing agent. The composition further increases the paper strength when used in combination with a conventional paper-strength improver.

15 Claims, No Drawings

ADDITIVE COMPOSITION FOR USE IN PAPERMAKING

This invention relates to an additive composition for use in paper-making and, more particularly, to an additive composition which is effective in increasing the paper strength and in fixation of other additives, causing neither paper discoloration nor blister formation.

Internal additives for paper-making may be broadly classified into paper-strength improvers, sizing agents and fixing agents. The paper-strength improvers and sizing agent are fixed generally with a fixing agent on a paper stock such as pulp in the slurry form.

The paper-strength improvers and the sizing agents of the cationic type are sometimes added to the paper stock without using a fixing agent, because they are adsorbable by themselves on the pulp. However, when a conventional cationic paper-strength improver is used, discoloration of paper and blister formation are observed and, in addition, the improvement in paper-strength is not so great. A conventional cationic sizing agent is not always satisfactory, because it has disadvantages such as deterioration of the paper strength.

This invention relates to a novel additive for use in paper-making, which is free from the above disadvantages and has both the unprecedentedly strong the effect of enhancing the paper-strength and effect of fixing other additives. It exhibits a paper-strength improving effect when used alone and exhibits both a favorable sizing effect and 2 paper-strength improving effect when used for fixing various sizing agents; the paper-strength improving effect of a conventional paper-strength improver can be further enhanced by use of the present additive along with the conventional paper-strength improver. The use of the present additive results in the simplification of the paper-making operation, without causing discoloration of paper or blister formation. Thus, the present additive composition has such various excellent properties.

An object of this invention is to provide an additive composition for use in paper-making.

Another object of this invention is to provide an additive composition for use in paper-making, which, when used cojointly with various sizing agents and/or conventional paper-strength improvers, enhances both the sizing effect and the paper-strength improving effect.

According to this invention, there is provided a paper-making additive comprising a water-soluble polymer having in its molecule —COOH groups and/or —SO$_3$H groups, polyaluminum chloride (hereinafter abbreviated to PAC) and an aqueous solvent.

It is presumed that in the present additive composition, there exists some physicochemical or chemical interactions between the molecules of PAC and the —COOH and/or —SO$_3$H groups of the water-soluble polymer, which leads to the formation of a kind of crosslinking structure among the polymer molecules through the PAC.

The formation of a kind of crosslinking structure due to the interaction among the molecules is presumable from the fact that when a water-soluble polymer having neither —COOH groups nor —SO$_3$H groups is mixed with PAC in an aqueous solvent, the resulting solution shows substantially no increase in viscosity, whereas when a water-soluble polymer having —COOH groups and/or —SO$_3$H groups is mixed with PAC in an aqueous solvent, the resulting solution in an aqueous solvent shows an increase in viscosity. Although the mechanism of the increase in paper-strength and of the fixation of other additives brought about by the additive composition of this invention is not yet clear, it is sufficiently understandable that an interrelationship exists between the above-noted interaction among molecules and the effect produced by the additive composition of this invention.

Examples of the main constituent of the water-soluble polymer which is one of the components of the additive composition of this invention include nonionic polymers, such as a polymer containing as constituent monomer acrylamide, methacrylamide, dimethylacrylamide, diacetoneacrylamide or the like; a saponified polyvinyl acetate; polyethylene glycol; polyvinylpyrrolidone; and the like, and cationic polymers containing as constituent monomer inorganic acid salts (for example, hydrochloride) and quaternary ammonium salts (for example, methyl chloride salt) of dimethylaminoethyl acrylate, diethylaminoethyl acrylate, dimethylaminoethyl methacrylate, diethylaminoethyl methacrylate, vinylpyridine and the like. Copolymers of the monomers constituting the above-mentioned cationic polymers (such monomers being hereinafter referred to as the cationic monomers) with one another, copolymers of the monomers constituting the above-mentioned nonionic polymers except polyethylene glycol (such monomers being hereinafter referred to as the nonionic monomers) with one another, and copolymers of the cationic monomers with the nonionic monomers may also be used as the main constituent of the water-soluble polymer. Further, the cationic monomers and/or the nonionic monomers may be copolymerized with at least one hydrophobic polymerizable unsaturated monomer, such as vinyl acetate, acrylonitrile, styrene, alkyl acrylates, alkyl methacrylates, and the like, in such an amount that the water-solubility of the resulting copolymer is not impaired, and the resulting copolymers may be used as the main constituent of the water-soluble polymer.

The —COOH group and the —SO$_3$H group which are supposed to have some sort of action on PAC can be introduced into the water-soluble polymer by copolymerizing the monomers constituting the aforesaid water-soluble polymer with a small amount of at least one vinyl monomer having said functional groups, namely ethylenically unsaturated mono- and di-carboxylic acids, for example, acrylic acid, methacrylic acid, itaconic acid, maleic acid, fumaric acid, crotonic acid, citraconic acid and the like, and ethylenically unsaturated sulfonic acids, for example, vinylsulfonic acid, 2-sulfoethyl acrylate, 2-acrylamido-2-methylpropanesulfonic acid and the like.

The copolymerization ratio of the vinyl monomer or monomers having —COOH group and/or —SO$_3$H group to the other monomers in the water-soluble polymer may vary depending upon the composition of polymer, the polymerization degree of polymer, the viscosity and concentration of the intended aluminum-containing polymer, and the use as a paper-making additive. If the —COOH and/or —SO$_3$H content is too high, the density of sites of action through PAC tends to be so high that the polymer becomes insoluble in water, while if the —COOH and/or —SO$_3$H content is zero, the aforesaid interaction is not caused and, hence, no solution of the intended aluminum-containing polymer in an aqueous solvent can be obtained.

Accordingly, a desirable proportion of the —COOH-containing vinyl monomer and/or the —SO₃H-containing vinyl monomer in the water-soluble polymer is at least 0.05 mole % in terms of mono-carboxylic or mono-sulfonic acid. A preferable upper limit of the said proportion is 10 mole % in terms of mono-carboxylic or mono-sulfonic acid, and when the water-soluble polymer contains only —COOH group, it is more preferably 2 mole %, and when the water-soluble polymer contains only —SO₃H group, it is more preferably 5 mole %. As a general tendency, a vinyl monomer containing —SO₃H group gives a desirable aqueous solution of the aluminum-containing polymer when copolymerized in a higher proportion than when a vinyl monomer containing —COOH group is copolymerized.

When the main constitutent of the water-soluble polymer is polyethylene glycol, one mole of the polyethylene glycol is reacted with not more than two moles of at least one saturated dicarboxylic acid, such as adipic acid, malonic acid, succinic acid, glutaric acid, pimeric acid, suberic acid, azelaic acid, sebacic acid and the like. The resulting ester has on the average not more than two terminal —COOH groups.

An example of especially preferable water-soluble polymer is a copolymer of 98.5 to 99.7 mole % of acrylamide and 0.3 to 1.5 mole % of acrylic acid.

The solution of an aluminum-containing polymer in an aqueous solvent is obtained by either mixing PAC with the water-soluble polymer in an aqueous solvent or copolymerizing the above-said monomers in a solution of PAC in an aqueous solvent. The concentration of the water-soluble polymer component in an aqueous solvent is not critical. However, the higher the concentration of the water-soluble polymer in an aqueous solvent, the more viscous the solution, and too viscous a solution is inconvenient in handling, whereas too low a concentration results in reduced working efficiency. Consequently, a concentration of 5 to 20% by weight based on the weight of the solution is generally preferred. Such a concentration is obtained by adjusting the amount of the above-said monomers charged when the solution in an aqueous solvent is prepared by copolymerizing the above-said monomers in an aqueous solution of PAC, as described later. The solvent may be water alone or in admixture with a small amount of a water-soluble organic solvent such as a lower alcohol, for example isopropyl alcohol.

PAC is represented by the general formula,

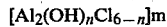

$$[Al_2(OH)_nCl_{6-n}]_m$$

where $1 \leq n \leq 5$, $m \leq 10$, basicity (%) = $(n/6) \times 100$. In this invention, commercially available PAC in the form of either aqueous solution or powder produced by a known method such as disclosed in Japanese Patent Publications No. 24,055/61, No. 17,301/63, No. 5,044/65, and No. 38,121/70 may be used. The most suitable aluminum source used in this invention is PAC. Such compounds as aluminum chloride and aluminum sulfate exhibit no interaction between their molecule and the —COOH and/or —SO₃H group in the water-soluble polymer, though the reason therefor is not clear. Consequently, the solution of the water-soluble polymer in an aqueous solvent prepared by use of such compounds does not exhibit properties sufficient for a paper-making additive. The amount of PAC used in terms of aluminum atom is preferably at least one equivalent to the —COOH and/or —SO₃H group in the water-soluble polymer; there is no upper limit and rather a large excess of PAC generally gives preferable characteristics to the solution of aluminum-containing polymer in an aqueous solvent. Since the optimum amount of PAC depends on the use field of the solution of aluminum-containing polymer in an aqueous solvent, it is suitably determined in accordance with the purpose of use.

The additive composition of this invention is used in paper-making in the same manner as conventional aluminum sulfate, and is usually added in the last stage of the addition of other additives or, if necessary, may be added before the addition of other additives. The amount of the present additive composition added may vary depending upon the intended paper type. Addition of the present additive composition in excess of the amount required for the intended paper type is economically insignificant, giving rise to no further improvement of the normally expected result, whereas the addition in too small an amount does not produce the expected result. The amount is usually small, and preferably about 0.25 to 1% by weight based on the weight of pulp slurry.

The additive composition of this invention is effectively used in the following ways.

(1) Joint use with sizing agents such as rosin size, paraffin wax size, synthetic resin size comprising petroleum resins, alkylketene dimer, and octadecylethylene urea to fix these agents onto the paper stock, resulting in an enhancement of both sizing degree and paper-strength.

(2) Joint use with paper-strength improvers such as polyacrylamide, partial hydrolyzate of polyacrylamide, alpha starch, oxidized starch and raw starch to fix these agents onto the paper stock, resulting in an improvement in fixing yield and paper-strength.

(3) Joint use with direct dyes, acid dyes, basic dyes, reactive dyes, fluorescent dyes, inorganic pigments, organic pigments, and inorganic fillers to fix these substances onto the paper stock, resulting in an improvement in fixing yield.

(4) Joint use with paper-strength improvers such as powdered polyvinyl alcohol, gelatinized polyvinyl alcohol, and cationic starch to enhance the paper-strength improving effect.

(5) Joint use with epichlorohydrin-modified polyamide-polyamine resin, urea-formaldehyde resin, or melamine-formaldehyde resin to improve paper-strength.

(6) Joint use with an internal flame retardant comprising antimony trioxide and a chlorinated hydrocarbon polymer such as chlorinated paraffin or chlorinated polypropylene to fix the agent onto the paper stock to reinforce the flame-resistance and to improve the texture.

(7) Joint use with a stiffening agent such as ammonium caseinate, gelatin, locust-bean gum, or guar gum to effectively improve the paper-strength and compressive strength.

(8) Joint use with aluminum sulfate as a fixing agent to further improve the fixing effect. In particular, joint use with aluminum sulfate in above items (1) to (7) gives more excellent effects.

(9) To a pulp which is considered to be low in chemicals-fixation thereon, such as semi-chemical pulp (SCP), are added the present additive composition and polyethyleneimine to improve the chemicals-fixation on the pulp.

The invention is illustrated below with reference to Examples and Comparative Examples. The testing methods used in the Examples and Comparative Examples were as follows:

Basis weight: According to Japanese Industrial Standard (hereinafter abbreviated as JIS) P 8124
 Breaking length: JIS P 8113
 Wet breaking length: JIS P 8135
 Specific bursting strength: JIS P 8112
 Wet specific bursting strength: JIS P 8112
 Specific compressive strength: JIS P 8126
 Sizing degree: JIS P 8122
 Flame resistance: JIS A 1322
 Shade (or dyeing density): by visual inspection In each of the Tables appearing hereinafter, (1) The amount of the additive used is in % by weight based on the weight of pure pulp.

(2) The amount of the additive composition of this invention used is in % by weight in terms of organic polymer component.

(3) The amount of aluminum sulfate used is in % by weight in terms of $Al_2O_3$.

(4) PAM stands for polyacrylamide.

(5) PAE stands for epichlorohydrin-modified polyamide-polyamine.

EXAMPLE 1 and Comparative Example 1

Into a 2-liter, four-necked, round bottom flask provided with a stirrer, a reflux condenser, a dropping funnel and a thermometer were charged 450 g of an aqueous solution of PAC (containing 10% by weight of $Al_2O_3$) and 200 g of water. The mixture was heated to 70° C. in a water bath. Then 350 g of a 30% by weight aqueous acrylamide solution and 1 g of acrylic acid were added dropwise through the dropping funnel to the above mixture at 70° C. over a period of two hours. Polymerization was initiated simultaneously with the dropwise addition. A 10% by weight solution of ammonium persulfate, used as polymerization initiator, was added as follows: 4 ml just before the beginning of dropwise addition of the monomer mixture, 3 ml after one hour from the initiation of polymerization, and 3 ml after two hours from the initiation of polymerization. After finishing the dropwise addition of the monomer mixture, the reactant mixture was allowed to stand at 70° C. The reaction was completed in 5 hours, yielding a viscous solution (that is, the additive composition of this invention) having a BV (viscosity measured by a BH-type rotational viscometer at 10 rpm. and 25° C.) of 14,900 cps. Paper specimens were made from a pulp slurry by using the above additive solution alone or in combination with a conventional additive [anionic polyacrylamide (hereinafter referred to as anionic PAM)] (Example 1). For comparison, paper specimens were made by using aluminum sulfate alone or in combination with anionic PAM or by using none of the additives (Comparative Example 1).

The paper-making conditions were as follows:
 Pulp used: LBKP:NBKP = 1:1 by weight
 Beating degree: 30° SR
 Basis weight: 60 g/m$^2$
 Type and amount of additive used: as shown in Table 1

Test results of the specific bursting strength (Bursting strength (kg/cm$^2$)/basis weight (g/m$^2$) determined on the above specimens are shown in Table 1.

Table 1

|  | Run No. | Additive composition of this invention* | Anionic PAM | Aluminum sulfate | Specific bursting strength |
|---|---|---|---|---|---|
| Example 1 | 1 | 0.25 | — | — | 5.15 |
|  | 2 | 0.5 | — | — | 5.22 |
|  | 3 | 1.0 | — | — | 5.50 |
|  | 4 | 2.0 | — | — | 5.96 |
|  | 5 | 0.5 | 0.25 | — | 5.35 |
|  | 6 | 0.5 | 0.5 | — | 5.56 |
|  | 7 | 0.75 | 1.0 | — | 5.81 |
|  | 8 | 0.1 | 2.0 | — | 6.11 |
| Comparative Example 1 | 1 | — | 0.25 | 0.45 | 4.51 |
|  | 2 | — | 0.5 | 0.45 | 4.76 |
|  | 3 | — | 1.0 | 0.45 | 5.10 |
|  | 4 | — | 2.0 | 0.45 | 5.45 |
|  | 5 | — | — | 0.45 | 3.83 |
|  | 6 | — | — | — | 4.32 |
|  | 7 | — | 0.25 | 0.1 | 4.41 |
|  | 8 | — | 1.0 | 0 | 4.54 |

Note:
*The additive contains PAM as alumina in an amount of 4.5 g per 10.6 g of resin.

Example 1, Run Nos. 1 and 3 are compared with Comparative Example 1, Run Nos. 7 and 3, respectively, because they are the same in resin content and alumina content. From these comparisons, it can be seen that the additive composition of this invention is superior in specific bursting strength.

From the comparison of Example 1, Run No. 3 with Comparative Example 1, Run Nos. 3 and 8, it can be seen that the additive composition of this invention is effective without using any conventional fixing agent because it contains an alumina component, while the conventional anionic PAM requires the joint use with a fixing agent (aluminum sulfate).

From Example 1, Run Nos. 5 to 8, it can be understood that when the additive composition of this invention is used along with the anionic PAM, the specific bursting strength is significantly increased even when aluminum sulfate is not used.

EXAMPLE 2 and Comparative Example 2

In Table 2 are shown the results of tests conducted on the paper specimens prepared by using the additive composition of this invention obtained in Example 1, and a rosin size, a paraffin wax size, or a synthetic petroleum resin size (Example 2) as well as the results of tests conducted on the paper specimens prepared in the same manner as the above except that aluminum sulfate is substituted for the additive composition of this invention (Comparative Example 2). The paper-making conditions were the same as in Example 1.

Table 2

|  | Run No. | Additive composition of this inventon | Rosin size | Al sulfate | Paraffin wax size | Synth. petroleum resin size | Specific bursting strength | Sizing degree (sec) |
|---|---|---|---|---|---|---|---|---|
| Example 2 | 1 | 0.5 | 1 | — | — | — | 5.38 | 27.2 |
|  | 2 | 0.5 | — | — | 1 | — | 5.34 | 28.2 |
|  | 3 | 0.5 | — | — | — | 1 | 4.73 | 25.3 |
| Comparative | 1 | — | 1 | 0.45 | — | — | 4.51 | 26.9 |

Table 2-continued

|  | Run No. | Additive composition of this inventon | Rosin size | Al sulfate | Paraffin wax size | Synth. petroleum resin size | Specific bursting strength | Sizing degree (sec) |
|---|---|---|---|---|---|---|---|---|
| Example 2 | 2 | — | — | 0.45 | 1 | — | 4.32 | 28.0 |
|  | 3 | — | — | 0.45 | — | 1 | 3.86 | 11.2 |

EXAMPLE 3 and Comparative Example 3

The procedure of Example 1 was repeated, except that the amount of the acrylic acid used was 0.7 g; a 1% by weight solution of ammonium persulfate was added as initiator as follows: 6 ml immediately before the initiation of dropwise addition of the monomers, 3 ml after one hour from the initiation of polymerization, and 3 ml after two hours from the initiation of polymerization. The polymerization was carried out at 80° C. There was obtained a solution having a BV of 10,550 cps.

Peper specimens were prepared by using the thus obtained additive solution as fixing agent for various dyes and a pigment. In Table 3 are shown the results of tests conducted on the above specimens (Example 3) together with Comparative Example 3, in which aluminum sulfate was substituted for the additive composition of this invention.

Paper-making conditions:
Pulp used: LBKP:NBKP = 1:1 by weight
Beating degree: 30° SR

EXAMPLE 4 and Comparative Example 4

The results of tests conducted on the paper specimens prepared by using a known cationic paper-strength improver jointly with the additive composition of this invention obtained in Example 1 are shown in Table 4, together with Comparative Example 4 in which the additive composition was not used or cationic PAM was substituted for the additive composition of this invention and PAE.

Paper-making conditions:
Pulp used: LBKP:NBKP = 1:1 by weight
Beating degree: 35° SR
Basis weight: 60 g/m$^2$ Table 4

|  | Run No. | Additive composition of this invention | Rosin size | PAE | Cationic PAM | Aluminum sulfate | Specific bursting strength | Wet specific bursting strength | Sizing degree (sec) |
|---|---|---|---|---|---|---|---|---|---|
| Example 4 | 1 | 0.225 | — | 0.025 | — | — | 5.00 | 0.61 |  |
|  | 2 | 0.450 | — | 0.050 | — | — | 5.48 | 0.72 |  |
|  | 3 | 0.90 | — | 0.10 | — | — | 6.07 | 0.85 |  |
|  | 4 | 1.80 | — | 0.20 | — | — | 6.34 | 1.24 |  |
|  | 5 | 0.90 | 1 | 0.1 | — | — | 6.02 | 1.79 | 45.7 |
| Comparative Example 4 | 1 | — | — | — | 0.25 | — | 4.35 | 0.36 |  |
|  | 2 | — | — | — | 0.5 | — | 4.65 | 0.45 |  |
|  | 3 | — | — | — | 1.0 | — | 4.61 | 0.47 |  |
|  | 4 | — | — | — | 2.0 | — | 4.62 | 0.50 |  |
|  | 5 | — | — | 0.25 | — | — | 4.32 | 0.41 |  |
|  | 6 | — | — | 0.50 | — | — | 4.66 | 0.78 |  |
|  | 7 | — | — | 1.00 | — | — | 5.07 | 1.08 |  |
|  | 8 | — | — | 2.00 | — | — | 5.29 | 1.55 |  |
|  | 9 | — | 1 | — | 1 | 0.45 | 5.26 | 0.71 | 38.3 |

EXAMPLE 5 and Comparative Example 5

Flame resistant paper of the internal additive type was prepared by using the additive composition of this invention obtained in Example 3, chlorinated polypropylene (hereinafter abbreviated as ClPP) and antimony trioxide (Sb$_2$O$_3$). The test results are shown in Table 5 along with Comparative Example 5.

Table 3

|  | Run No. | Dye or pigment (% by weight) |  | Additive composition of this invention | Rosin size | Al sulfate | Shade |
|---|---|---|---|---|---|---|---|
| Example 3 | 1 | Basic dye | 2 | 1 | — | — | Deep |
|  | 2 | Basic dye | 2 | 1 | 1 | — | Deep |
|  | 3 | Fluorescent dye | 1 | 0.5 | 1 | — | Brightening good |
|  | 4 | Direct dye | 2 | 1 | — | — | Normal |
|  | 5 | Acid dye | 2 | 1 | — | — | Normal |
|  | 6 | Coloring pigment | 2 | 1 | 1 | — | Deep |
| Comparative Example 3 | 1 | Basic dye | 2 | — | — | 0.45 | Very pale |
|  | 2 | Basic dye | 2 | — | 1 | 0.45 | Light |
|  | 3 | Fluorescent dye | 1 | — | 1 | 0.45 | Normal |
|  | 4 | Direct dye | 2 | — | — | 0.45 | Normal |
|  | 5 | Acid dye | 2 | — | — | 0.45 | Hardly dyed |
|  | 6 | Coloring pigment | 2 | — | 1 | 0.45 | Normal |

Table 6

|  | Example 6 | | | Comparative Example 6 | | | |
| --- | --- | --- | --- | --- | --- | --- | --- |
| Run No. | 1 | 2 | 3 | 1 | 2 | 3 | 4 |
| Additive: | | | | | | | |
| Ammonium caseinate (wt. %) | 2 | — | — | — | 2 | — | — |
| Gelatin (wt. %) | — | 2 | — | — | — | 2 | — |
| Locust-bean gum (wt. %) | — | — | 2 | — | — | — | 2 |
| Aluminum sulfate (wt. %) | — | — | — | — | 0.45 | 0.45 | 0.45 |
| Additive composition of this invention (wt. %) | 1 | 1 | 1 | — | — | — | — |
| Test result: | | | | | | | |
| Specific bursting strength | 6.2 | 6.7 | 6.5 | 5.2 | 5.6 | 6.1 | 6.0 |
| Breaking length (km) | 7.6 | 8.0 | 8.1 | 6.1 | 7.3 | 7.4 | 7.7 |
| Specific compressive strength* | 16.5 | 17.1 | 15.3 | 13.2 | 16.1 | 16.3 | 14.9 |

Note: * = $\dfrac{\text{Compressive strength (kg)}}{\text{Basis weight (g/m}^2\text{)}} \times 100$ Paper-making conditions:
Pulp used: LBKP:NBKP = 1:1 by weight
Beating degree: 25° SR
Basis weight: 80 g/m$^2$ Table 5

|  | Example 5 | | Comparative Example 5 |
| --- | --- | --- | --- |
|  | Run No. 1 | Run No. 2 |  |
| Additive: | | | |
| ClPP (wt. %) | 30 | 25 | 30 |
| Sb$_2$O$_3$ (wt. %) | 15 | 12.5 | 15 |
| Rosin size (wt. %) | 1 | 1 | 1 |
| Anionic PAM (wt. %) | 1 | 1 | 1 |
| Aluminum sulfate (wt. %) | — | — | 0.75 |
| Additive composition of this invention | 1 | 1 | — |
| PAM flocculant (wt. %) | 0.05 | 0.05 | 0.05 |
| Test results: | | | |
| Flame resistance (grade) | First grade | First grade | First grade |
| Carbonized area (cm) | 4.3 × 5.5 | 4.5 × 6.0 | 4.5 × 6.0 |
| Sizing degree (sec) | 136 | 134 | 125 |
| Breaking length (km) | 4.69 | 4.71 | 4.63 |
| Wet breaking length (km) | 1.08 | 0.96 | 0.92 | bean gum was fixed. The results obtained are shown in Table 6.

Paper-making conditions:
Pulp used: NUKP 100%
Beating degree: 40° SR
Basis weight: 125 g/m$^2$

EXAMPLE 7 and Comparative Example 7

An additive composition of this invention having a BV of 7,600 cps was prepared by repeating the procedure of Example 1, except that 1 g of maleic acid was used in place of the acrylic acid. By use of this additive composition, the chemicals-fixation on SCP was improved under the following conditions.

Pulp used: SCP 100%
Beating degree: 30° SR
Basis weight: 125 g/m$^2$
Chemicals used: polyethyleneimine (abbreviated as PEI)

The test results are shown in Table 7 together with Comparative Example 7.

From Comparative Example 7, Run Nos. 1 to 3, it can be seen that in the case of SCP, the effect of chemicals are difficult to obtain.

Example 7, Run No. 3 is compared with Comparative Example 7, Run No. 2 in substantially the same resin Table 7

|  | Example 7 | | | Comparative Example 7 | | |
| --- | --- | --- | --- | --- | --- | --- |
|  | Run No. 1 | Run No. 2 | Run No. 3 | Run No. 1 | Run No. 2 | Run No. 3 |
| Additive: | | | | | | |
| PEI (wt. %) | — | 0.1 | — | — | — | — |
| Additive composition of this invention (wt. %) | 1 | 1 | 0.6 | — | — | — |
| Aluminum sulfate (wt. %) | 0.15 | 0.15 | 0.15 | — | 0.45 | 0.6 |
| Anionic PAM (wt. %) | — | — | — | — | 0.6 | 1 |
| Test result: | | | | | | |
| Specific bursting strength | 3.30 | 3.37 | 3.21 | 2.96 | 3.02 | 3.04 |
| Specific compressive strength | 19.2 | 21.9 | 18.3 | 15.3 | 16.1 | 16.4 |

EXAMPLE 6 and Comparative Example 6

In a three-necked flask was placed 1 kg of a 15 weight % aqueous solution (1,100 cps in viscosity) of a water-soluble interpolymer of acrylamide/methyl acrylate/2-acrylamido-2-methylpropanesulfonic acid (100/10/2 in molar ratio). Into the flask at 20° C. was added 500 g of an aqueous solution of PAC with stirring, and the stirring was continued for one hour. The contents of the flask became increasingly viscous and the resulting solution of an aluminum-containing polymer in the aqueous solvent showed a viscosity of 45,000 cps after one hour. By use of the thus obtained additive of this invention, an internally added casein, gelatin or locustand alumina contents, and Example 7, Run No. 1 is also compared with Comparative Example 7, Run No. 3. From these comparisons, it can be seen that the additive composition of this invention is significantly superior in both specific bursting strength and specific compressive strength. Example 7, Run No. 2 indicates that the use of the additive composition of this invention along with PEI is more effective.

EXAMPLE 8

In a 2-liter, four-necked, round bottom flask equipped with a stirrer, a thermometer, an inert gas-blowing pipe and a condenser were placed 100 g of adipic acid and 1,000 g of polyethylene glycol having an average degree of polymerization of about 1,000, and the contents were gradually heated with stirring while blowing a nitrogen gas into the flask at a rate of about 200 ml/min to elevate the temperature to 150°-160° C. over about one hour. At said temperature, the reaction was effected for one hour. The reaction temperature was then gradually elevated so that the tower top temperature of the side pipe condenser did not exceed 100° C., and was maintained at 210° C. When the amount of the condensation water distilled off became small as the reaction proceeded, the heating was stopped and a carboxylated polyethylene glycol resin was taken out of the flask.

In a 2-liter, three-necked, round bottom flask equipped with a stirrer, a reflux condenser and a thermometer were placed 450 g of an aqueous PAC solution (containing 10% by weight of alumina) and 340 g of water, and the contents were heated to 70° C. in a water bath. At said temperature, 210 g of a 50% by weight aqueous solution of the carboxylated polyethylene glycol obtained above was added to the flask and subjected to reaction at 70° C. for two hours to obtain a viscous solution having a BV of 5,100 cps.

Paper specimens were prepared by using the thus obtained additive solution under the same paper-making conditions as in Example 1, and the same test as in Example 1 was conducted to obtain the results shown in Table 8.

Table 8

| Run No. | Amount of additive composition of this invention | Specific bursting strength |
|---|---|---|
| 1 | 0.5 | 5.02 |
| 2 | 1.0 | 5.33 |

EXAMPLE 9

The same procedure as in Example 1 was repeated, except that 0.5 g of acrylic acid and 1 g of 2-acrylamide-2-methylpropane sulfonic acid were substituted for the 1 g of acrylic acid, to obtain a solution having a BV of 8,900 cps.

Paper specimens were prepared by using the thus obtained additive solution under the same paper-making conditions as in Example 1, and the same test as in Example 1 was conducted to obtain the results shown in Table 9.

Table 9

| Run No. | Amount of additive composition of this invention | Specific bursting strength |
|---|---|---|
| 1 | 0.5 | 5.16 |
| 2 | 1.0 | 5.43 |

EXAMPLE 10

In a 2-liter, four-necked, round bottom flask equipped with a stirrer, a reflux condenser, a dropping funnel and a thermometer were placed 450 g of an aqueous PAC solution (containing 10% by weight of alumina) and 200 g of water, and the contents were heated to 70° C. in a water bath. From the dropping funnel, 350 g of a 30% by weight aqueous solution of dimethylaminoethyl methacrylate hydrochloride and 1 g of itaconic acid were added dropwise over two hours. Polymerization was initiated by the addition of the monomers.

A 10% by weight aqueous solution of ammonium persulfate was added as a polymerization initiator as follows: 2 ml just before the initiation of the polymerization, 1 ml after one hour from the initiation of the polymerization, and 1 ml after two hours from the initiation of the polymerization. The reaction was terminated in five hours to obtain a viscous solution having a BV of 7,600 cps.

Paper specimens were prepared by using the thus obtained additive solution under the same paper-making conditions as in Example 1, and the same test as in Example 1 was conducted to obtain the results shown in Table 10.

Table 10

| Run No. | Amount of additive composition of this invention | Specific bursting strength |
|---|---|---|
| 1 | 0.5 | 5.29 |
| 2 | 1.0 | 5.72 |

What is claimed is:

1. An additive composition for use in paper-making, which comprises
   (1) a water-soluble polymer containing as a structural unit a vinyl monomer having —COOH group or a vinyl monomer having —SO$_3$H group or both of them in a proportion of 0.05 to 10 mole percent (in terms of monocarboxylic sulfonic acid) based on the water soluble polymer,
   (2) polyaluminum chloride of the formula

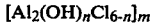
   $$[Al_2(OH)_nCl_{6-n}]_m$$

where $1 \leq n \leq 5$ and $m \leq 10$, the amount of polyaluminum chloride in terms of aluminum atom being at least equivalent to the —COOH group and/or —SO$_3$H group in the water-soluble polymer, and an aqueous solvent.

2. A composition according to claim 1, wherein the amount of water-soluble polymer is 5 to 20% by weight based on the weight of the composition.

3. A composition according to claim 1, wherein the water-soluble polymer contains as a structural unit 0.05 to 2 mole percent of a vinyl monomer having —COOH group in terms of mono-carboxylic acid.

4. A composition according to claim 1, wherein the water-soluble polymer contains as a structural unit 0.05 to 5 mole percent of a vinyl monomer having —SO$_3$H group as a mono-sulfonic acid.

5. A composition according to claim 1, wherein the vinyl monomer having —COOH group is selected from the group consisting of acrylic acid, methacrylic acid, itaconic acid, maleic acid, fumaric acid, crotonic acid, and citraconic acid, and the vinyl monomer havin —SO$_3$H group is selected from the group consisting of vinyl sulfonic acid, 2-sulfoethyl acrylate, and 2-acrylamido-2-methylpropanesulfonic acid.

6. A composition according to claim 3, wherein the vinyl monomer having —COOH group is at least one monomer selected from the group consisting of acrylic acid, methacrylic acid, itaconic acid, maleic acid, fumaric acid, crotonic acid and citraconic acid.

7. A composition according to claim 4, wherein the vinyl monomer having —SO$_3$H group is at least one monomer selected from the group consisting of vinyl sulfonic acid, 2-sulfoethyl acrylate, and 2-acrylamido-2-methylpropanesulfonic acid.

8. A composition according to claim 1, wherein the water-soluble polymer contains as main structural unit 90 to 99.5 mole percent of a polymerizable nonionic unsaturated monomer or a polymerizable cationic unsaturated monomer or both monomers.

9. A composition according to claim 8, wherein the polymerizable nonionic unsaturated monomer is at least one member selected from the group consisting of acrylamide, methacrylamide, dimethylacrylamide, and diacetoneacrylamide and the polymerizable cationic unsaturated monomer is at least one member selected from the group consisting of inorganic acid salts and quaternary ammonium salts of dimethylaminoethyl acrylate, diethylaminoethyl acrylate, dimethylaminoethyl methacrylate, diethylaminoethyl methacrylate, and vinylpyridine.

10. A composition according to claim 5, wherein the water-soluble polymer contains as the main structural unit at least one monomer selected from the group consisting of acrylamide, methacrylamide, dimethyl acrylamide, diacetoneacrylamide, and inorganic acid salts and quaternary ammonium salts of dimethylaminoethyl acrylate, diethylaminoethyl acrylate, dimethylaminoethyl methacrylate, diethylaminoethyl methacrylate and vinylpyridine.

11. A composition according to claim 9, wherein the water-soluble polymer contains as another structural unit a polymerizable unsaturated hydrophobic monomer in such an amount that the water-solubility of the polymer is not impaired.

12. A composition according to claim 11, wherein the polymerizable unsaturated hydrophobic monomer is one member selected from the group consisting of vinyl acetate, acrylonitrile, styrene, alkyl acrylates, and alkyl methacrylates.

13. A composition according to claim 8, wherein the water-soluble polymer is a copolymer of 98.5 to 99.7 mole percent of acrylamide and 0.3 to 1.5 mole percent of acrylic acid.

14. A method of strengthening paper comprising mixing with paper pulp a water-soluble polymer having —COOH groups, —SO$_3$H groups or both said groups in a proportion of 0.05 to 10 mole percent based on the water-soluble polymer; and an amount sufficient of polyaluminum chloride of the formula $$[Al_2(OH)_nCl_{6-n}]_m$$

wherein n is 1–5 and m is 1–10 to interact with the —COOH or —SO$_3$H groups or both of the water-soluble polymer to form a cross-linking structure among the polymer molecules through the polyaluminum chloride; and forming the paper pulp into a paper structure having increased strength.

15. A product obtained by the process of claim 14.

* * * * *